United States Patent
Chang

(10) Patent No.: US 8,009,510 B2
(45) Date of Patent: Aug. 30, 2011

(54) TWO WAY CHECK SHOT AND REVERSE VSP WHILE DRILLING

(75) Inventor: Chung Chang, Lexington, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 138 days.

(21) Appl. No.: 12/256,860

(22) Filed: Oct. 23, 2008

(65) Prior Publication Data
US 2010/0101861 A1   Apr. 29, 2010

(51) Int. Cl.
*G01V 1/42* (2006.01)
*E21B 47/00* (2006.01)

(52) U.S. Cl. .............. 367/57; 367/25; 367/27; 175/40

(58) Field of Classification Search .......... 367/56, 367/57, 58, 25, 27
See application file for complete search history.

(56) References Cited

U.S. PATENT DOCUMENTS

| | | | | |
|---|---|---|---|---|
| 5,742,560 | A * | 4/1998 | Krebs | 367/57 |
| 5,901,113 | A * | 5/1999 | Masak et al. | 367/57 |
| 6,131,694 | A | 10/2000 | Robbins et al. | |
| 6,332,507 | B1 * | 12/2001 | Naville et al. | 181/102 |
| 6,430,508 | B1 * | 8/2002 | Sudhakar et al. | 702/6 |
| 6,606,009 | B2 | 8/2003 | Gunawardana et al. | |
| 6,912,465 | B2 | 6/2005 | Collins et al. | |
| 7,190,280 | B2 | 3/2007 | Hall et al. | |
| 7,617,908 | B2 | 11/2009 | Chang et al. | |
| 7,688,674 | B2 | 3/2010 | Underhill et al. | |
| 2006/0077757 | A1 | 4/2006 | Cox et al. | |
| 2009/0097356 | A1 * | 4/2009 | Haldorsen et al. | 367/24 |

OTHER PUBLICATIONS

Breton et al, "Well positioned seismic measurements", Oilfield Review, pp. 32-45, Spring, 2002.

* cited by examiner

*Primary Examiner* — Ian J Lobo
(74) *Attorney, Agent, or Firm* — Rachel Greene; Brigid Laffey; Helene Raybaud

(57) ABSTRACT

Methods and related systems are described making seismic measurements. Seismic energy is transmitted into the earth using a surface seismic source. The seismic energy is received with one or more downhole receivers located in a borehole. In response to the received seismic energy from the surface seismic source, seismic energy is transmitted into the earth using a downhole seismic source. The seismic energy from the downhole seismic source is then received with one or more surface receivers located on the surface of the earth. A delay interval is measured downhole between the first arrival of the seismic energy from the surface seismic source and the transmission from the downhole seismic source. A surface interval is measured between the transmitting of seismic energy from the surface seismic source and first arrival of the seismic energy from the downhole seismic source using the one or more surface receivers. Travel time can be calculated by subtracting the delay interval from the surface interval.

18 Claims, 5 Drawing Sheets

TWO WAY CHECK SHOT AND REVERSE VSP WHILE DRILLING

BACKGROUND OF THE INVENTION

1. Field of the Invention

This patent specification relates borehole and surface seismic technology. More particularly, this patent specification relates to systems and methods for making seismic measurements from borehole and surface deployed seismic sources and receivers.

2. Background of the Invention

The majority of oil exploration drilling decisions are based upon the seismic survey map. However, in surface seismic surveys the velocity information along the depth are derived from the surface receiver array. That information is less and less accurate when the depth of interest increases. Due to the above reason the depth as well as the shape of the oil reservoir is often distorted and inaccurately mapped as the depth of the reservoir increases. Therefore, oil companies risk landing their wells at the wrong places and waste significant amount of capital investment. There are increasing needs for refining the seismic map while drilling. Because of the drilling situation, one can measure the velocity directly from the bit to the surface by using a pair of seismic source and receiver. However, the traditional wireline-based borehole seismic measurements that provide such a measurement are not transparent to the drilling process and often require a significant amount of rig time. Therefore, it is challenging to perform such measurements inexpensively and easily while drilling. Thus there is a need to provide the industry with a new way of measuring seismic velocity accurately while drilling with a minimum interference to the current drilling practices. With accurate velocities at depth geophysicists and geologists in the oil companies can update their seismic map to make accurate decisions in developing their reserves. Such new technology could provide a better map and make their jobs easier and more successful.

Tools such as Schlumberger's Seismic VISION tool are designed to solve the logistical problem of wireline borehole seismic intervention and provide accurate velocity measurement while drilling. Due to the lack of cable connection in the drilling process, the firing of a surface seismic source with down hole receivers is carefully synchronized. A significant challenge in such technologies is synchronizing the clocks between the firing of a surface seismic source and recording of down hole receivers. A pair of highly accurate clocks are used, one up hole and one down hole, and schedule the surface firing at a preprogrammed schedule and start the downhole receiver measurements according to the same schedule. For example, see U.S. Pat. No. 6,606,009 which discloses a dual mode oscillator crystal with a first output having a frequency related to temperature and a second output having a frequency substantially stable with respect to temperature; and U.S. Pat. No. 6,912,465 which discloses methods for determining the drift of a clock adapted for subsurface disposal.

Another drawback of this type of method is that one loses the flexibility of the data acquisitions and the measurement itself creates unnecessary operational difficulties both on the service and drilling crews. In addition, the highly accurate clocks are generally expensive to build and maintain. Furthermore, due to the limited bandwidth of communication from the borehole tool to the surface, it can be challenging to transmit the downhole-recorded seismic data to the surface.

SUMMARY OF THE INVENTION

According to embodiments, a method of making seismic measurements is provided. Seismic energy is transmitted into the earth using a surface seismic source located on the surface of the earth. The seismic energy from the surface seismic source is received with one or more downhole receivers located in a borehole. In response to the received seismic energy from the surface seismic source, seismic energy is transmitted into the earth using a downhole seismic source located in a borehole. The seismic energy from the downhole seismic source is then received with one or more surface receivers located on the surface of the earth.

Additionally, according to some embodiments, a delay interval is measured downhole between the first arrival of the seismic energy from the surface seismic source and the transmission from the downhole seismic source using the one or more downhole receivers. The measured delay interval is transmitted to the surface. On the surface, a surface interval is measured between the transmitting of seismic energy from the surface seismic source and first arrival of the seismic energy from the downhole seismic source using the one or more surface receivers. A travel time can be calculated based at least in part on the measured surface interval and the measured delay interval.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
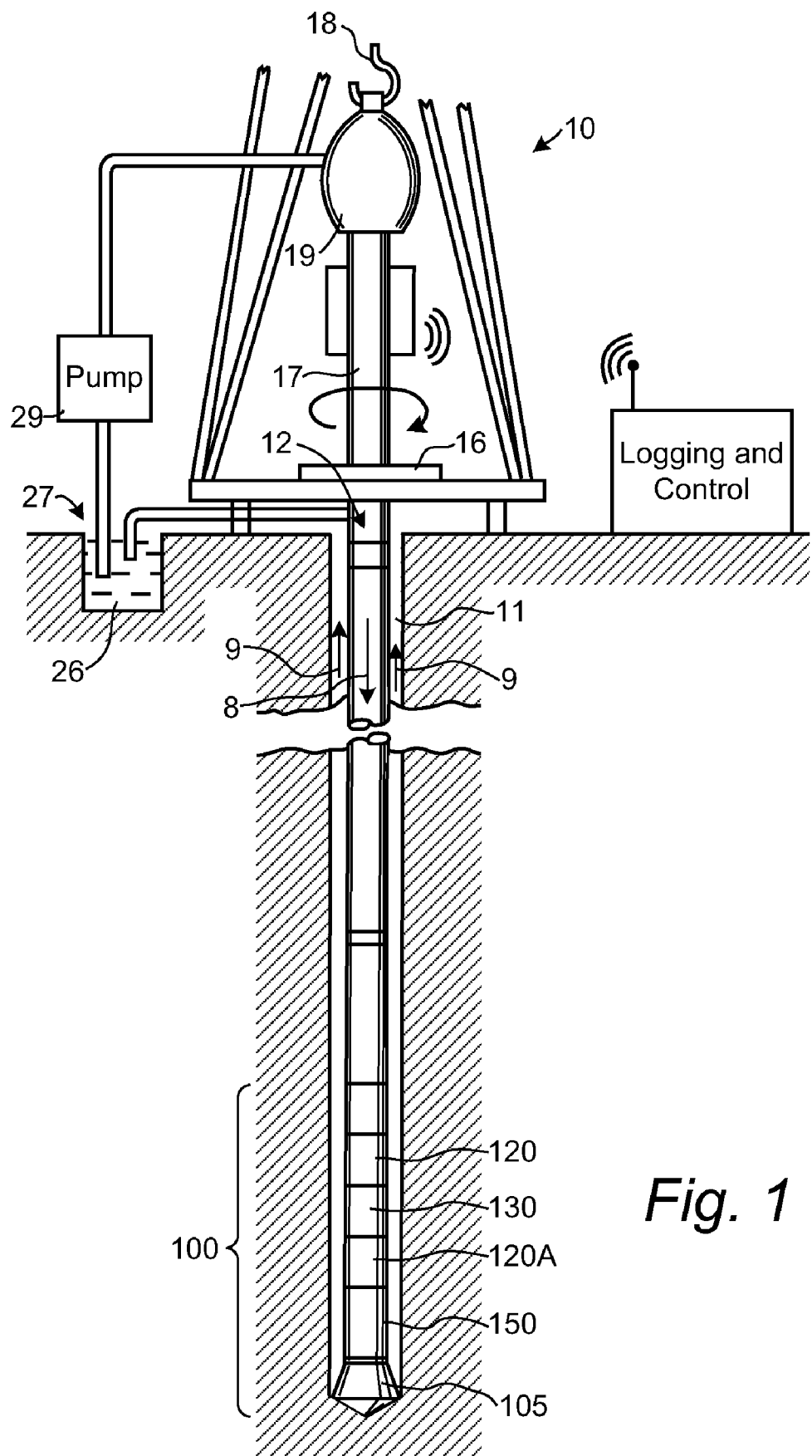
FIG. 1 illustrates a wellsite system in which the present invention can be employed.

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to some embodiments, techniques are provided that do not rely on synchronized clocks to solve for the timing problem, as well as bypass the bandwidth bottleneck associated with current drilling telemetry systems in sending recorded waveforms to the surface by recording the signals at the surface instead. In addition with a contact downhole seismic source, the reliability of the acoustic coupling to the formation and to the surface geophones is greatly improved. Other benefits include larger angle coverage for the velocity measurements due to the inexpensive and easily installed surface seismic receiver arrays.

According to some embodiments, a new technique is provided to accurately measure the seismic wave travel time from a downhole drill bit to a surface receiver. The system includes a downhole seismic source that can be activated after the down hole detector detects the firing of a surface seismic source. By adding in a down hole seismic source, two-way check shot measurements are provided, each with receivers at the opposite side of the source.

This innovative data acquisition system eliminates the need of clock synchronization and improves the accuracy of the velocity measurement. Due to the availability of surface seismic acquisition systems one can deploy many surface receivers to cover a wide range of angles while measuring the speed from the downhole seismic source to the surface. According to the reciprocal theorem those waveforms detected at the surface with a downhole source will be similar to those waveforms detected downhole with a surface seismic source. Therefore, there is no need for sending the downhole seismic waveforms to the surface. According to some embodiments, look-ahead-of-drillbit capability is provided at the surface. In addition with anchored surface geophones and a contact downhole seismic source, the acoustic coupling problem associated with current seismic while drilling systems are alleviated.

According to some embodiments the delay time between the time of receiving the surface source firing and the time of activating the down hole seismic source is transmitted from the downhole tool to the surface. This is a relatively small amount of data that can be sent easily using mud pulse telemetry. With this new technique, the time information that obtained either from the surface receiver or downhole receiver are independent from each other. According to these embodiments, for each time measurement either on the surface or downhole, we measure only the relative time between events recorded by individual clock. Therefore, there is no longer a need to synchronize both clocks. In addition receivers with strong nearby sources will have no problem of measuring the accurate time when one fires the source.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a seismic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2A:
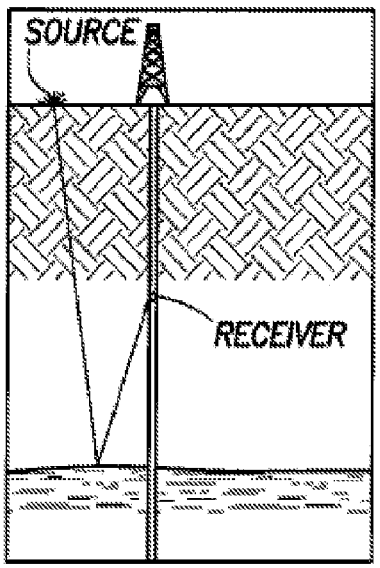
FIGS. 2a-d illustrate a seismic-while-drilling tool, according to some embodiments.
Figure 2B:
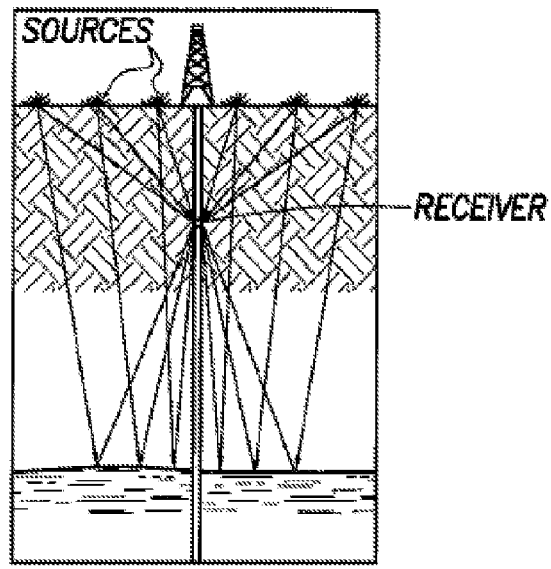
Figure 2C:
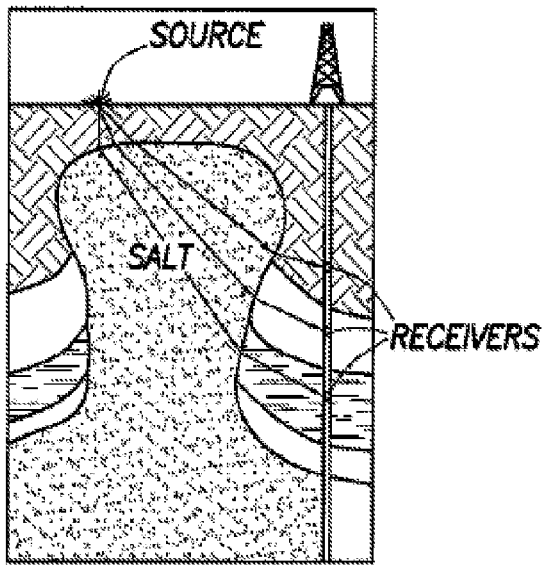
Figure 2D:
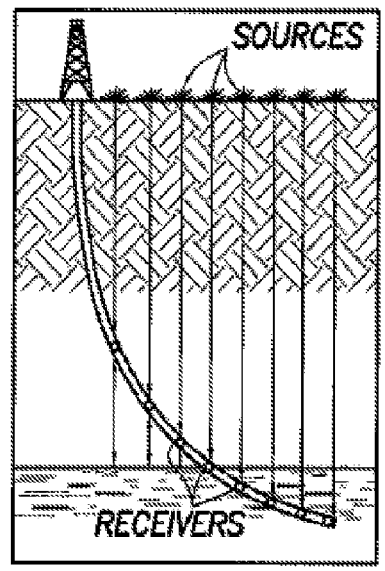

FIGS. 2a-d illustrate a seismic-while-drilling tool which can be the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD tool can have a single receiver (as depicted in FIGS. 2a and 2b), or plural receivers (as depicted in FIGS. 2c and 2d), and can be employed in conjunction with a single seismic source at the surface (as depicted in FIGS. 2a and 2c) or plural seismic sources at the surface (as depicted in FIGS. 2b and 2d). Accordingly, FIG. 2a, which includes reflection off a bed boundary, and is called a "zero-offset" vertical seismic profile arrangement, uses a single source and a single receiver, FIG. 2b, which includes reflections off a bed boundary, and is called a "walkaway" vertical seismic profile arrangement, uses plural sources and a single receiver, FIG. 2c, which includes refraction through salt dome boundaries, and is called a "salt proximity" vertical seismic profile, uses a single source and plural receivers, and FIG. 2d, which includes some reflections off a bed boundary, and is called a "walk above" vertical seismic profile, uses plural sources and plural receivers.

Figure 3:
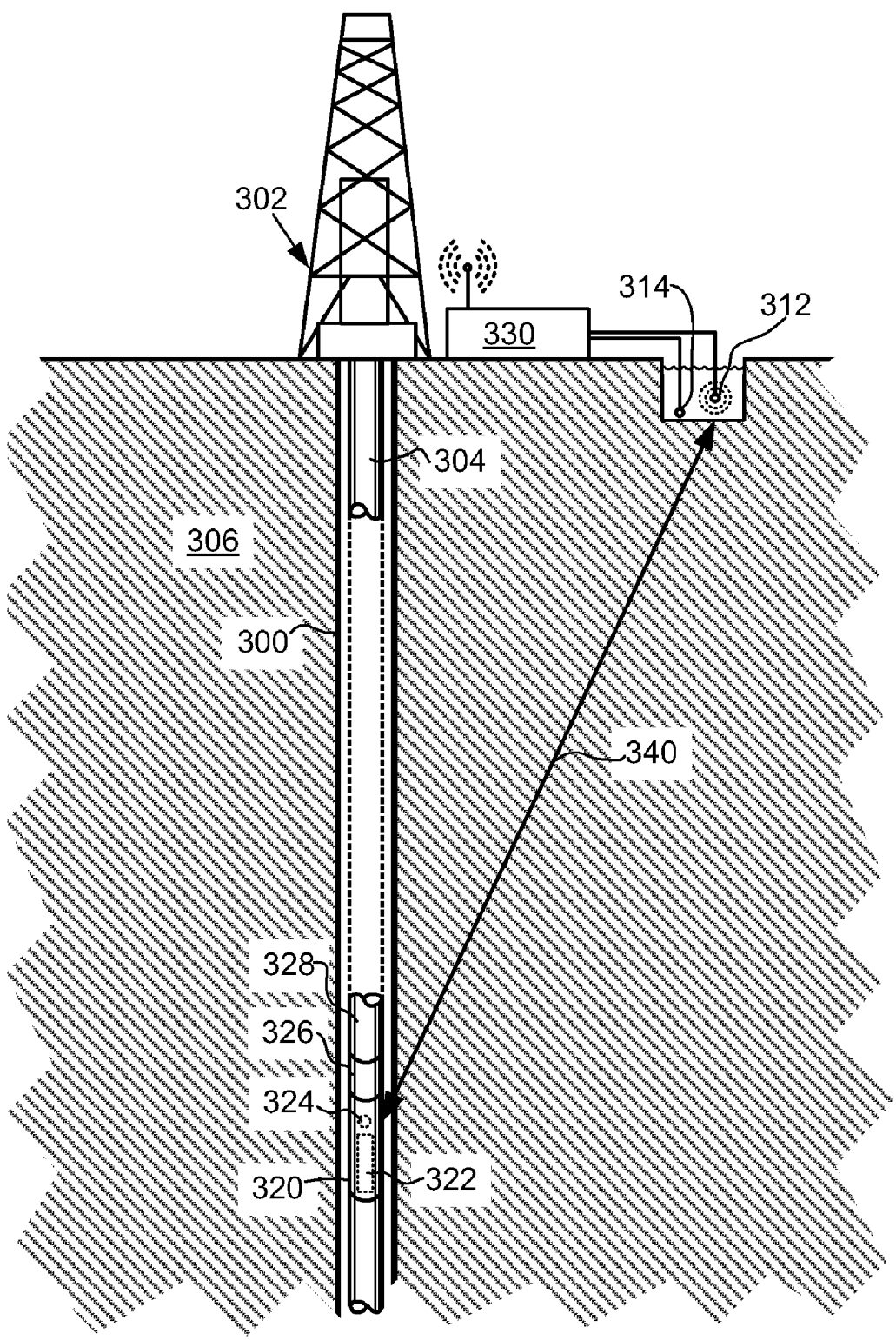
FIG. 3 shows a system for making seismic measurements, according to some embodiments.

FIG. 3 shows a system for making seismic measurements, according to some embodiments. On the surface is located water-filled pit 310 into which one or more seismic receivers 314 and a seismic source 312 are positioned. Seismic source 312 is an air gun and the seismic receivers are geophones. As will be described in greater detail below, according to some embodiments one or more arrays of geophones, sometimes buried, can be used to measure the seismic signals at the surface. Extending from wellhead 302 is wellbore 300 within subterranean formations 306. Within wellbore 300 is drillstring 304 including a drillbit (not shown). Mounted on drillstring 304 is downhole seismic unit 320 which includes a downhole source 322 and one or more downhole receivers such as receiver 324. Downhole control unit 326 includes a memory storage and is capable of receiving and storing measurements made by the downhole receivers. Control unit 326 is also capable of causing source 322 to initiate transmission of seismic energy. Control unit 326 is also capable of sending information from to the surface via downhole telemetry unit 328. According to some embodiments, control unit measures the time delay between the first arrival of seismic energy from surface to the transmission of seismic energy from the downhole source as measured by the downhole receivers. The wellhead 302, source 312 and receiver(s) 314 are in communication with processing station 330 which could be located at the wellhead, in the seismic unit or in some other location. Processing unit 330 includes one or more processors, memory, storage, user interfaces, input/output modules, and the like. The processing unit can also include a surface control system to measure the surface interval between the transmission of seismic energy from surface seismic source 312 and the first arrival of seismic energy from the downhole seismic source 322 using the surface receivers 314. Ray trace 340 shows the direct path of a compressional wave from surface source 312 to downhole receiver 324, and from downhole source 322 to surface receiver 314.

According to some embodiments the downhole seismic source can be implemented using an existing hydraulic or mechanical jar device which is designed to deliver an impact load to another downhole component which may be prone to sticking. For example, see the Hyrdraulic Jar from Schlumberger. According to some embodiments, a downhole seismic source such as described in co-pending U.S. Patent Application Publication reference US2008/0110691, which is incorporated herein by reference. According to some embodiments, a seismic vibrator such as a vibroseis truck is used as the surface seismic source. When vibroseis is used, signal processing downhole is used to deconvolved the chirp signal.

Figure 4:
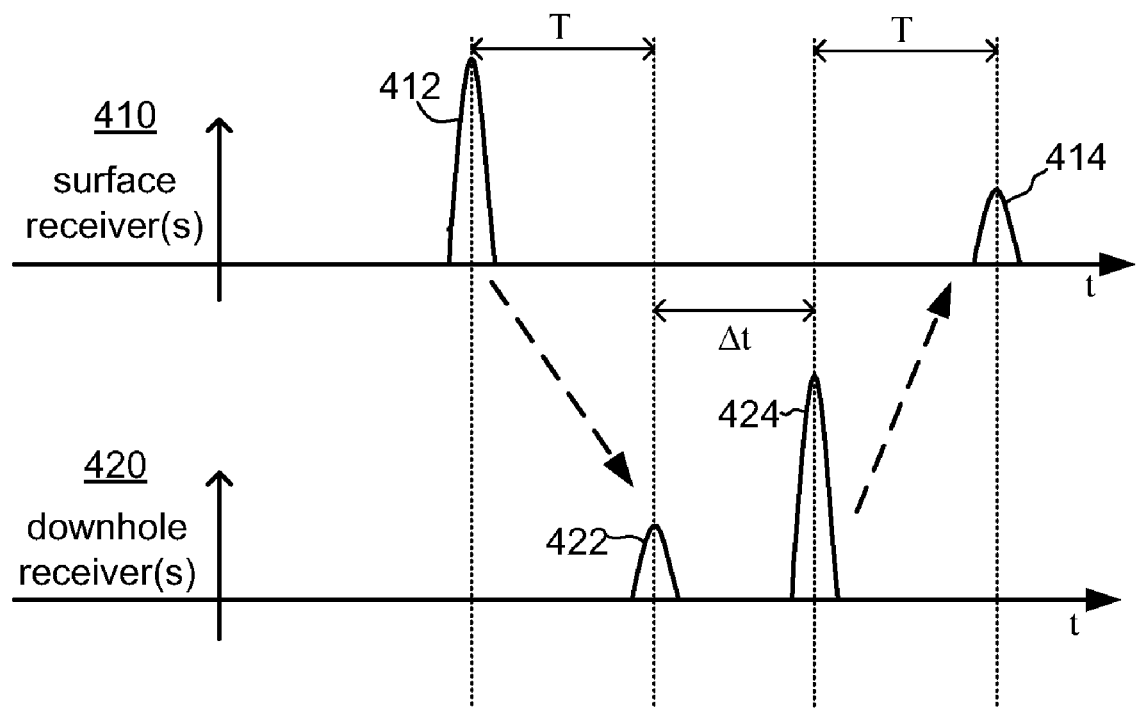
FIG. 4 is a timing diagram illustrating a method for making seismic measurements during a drilling operation, according to some embodiments.

FIG. 4 is a timing diagram illustrating a method for making seismic measurements during a drilling operation, according to some embodiments. The measurement sequence shown in FIG. 4 is performed during time when the drilling has stopped. The upper plot 410 illustrates the response from a surface receiver, such as surface receiver 314 shown in FIG. 3. The lower plot 420 shows the response from a downhole receiver, such as down hole receiver 324 shown in FIG. 3. Waveforms 412 and 422 are the respective surface receiver's and downhole receiver's responses to the firing of the surface source. The one-way traveltime from the surface to the downhole location is represented by the distance "T" in the timing diagram. Similarly, waveforms 414 and 424 are the respective surface receiver's and downhole receiver's responses to the firing of the downhole source. The one-way traveltime from the downhole location to the surface location is also represented by the distance "T". The time difference measured at a surface receiver between the surface source firing and the reception of the down hole source firing is two-way round trip time 2T plus the time delay, denoted "$\Delta t$", of activating the down hole source after the down hole receiver received the surface source signal. According to some embodiments, this delay time $\Delta t$ is determined by the downhole receiver measurement and is sent up hole through mud telemetry once the drilling resumes. According to some alternative embodiments, the delay time $\Delta t$ is predetermined and programmed into the downhole seismic unit such that the downhole source will fire after a predetermined amount of time such that the delay time $\Delta t$ is constant and known ahead of time at the surface. In such cases, the delay time $\Delta t$ need not be transmitted to the surface.

The two-way check shot time can be determined from the surface recording by subtracting the delay time $\Delta t$, either sent up while drilling continues, or as predeteremined. According to some embodiments, the described reception and firing process is repeated several times to enhance the signal to noise ratio through waveform stacking on the surface.

Advantageously, with described techniques, the time information obtained either from the surface receiver or downhole receiver are independent from each other. Because for each time measurement, either on the surface or downhole we measure only the relative time between events recorded by individual clock, there is no longer a need to synchronize both clocks. In addition receivers with a nearby strong sources will have no problem in determining the precise time of source firing.

Note that with acquisition strategies described herein, the downhole source will be fired after the surface source firing. Since there are typically no electrical links between the down hole tool and surface equipment, according to some embodiments, the down hole source firing is controlled via drawwork motion or mud circulation to set off a down hole mechanical source that will cause an impact at the bottom of the hole. Since the source is in contact with the formation, there will not be any acoustic coupling problems. In drilling environment there are tremendous fluid dynamic and elastic energy available due to the need of mud circulation and weight-on-bit. According to some embodiments, this potential power is utilized to activate the downhole source. As previously mentioned, according to some embodiments, a drilling jar is used to produce a repeatable downward impact at the bottom of the hole without pulling the rest of drilling string. The jar can be activated by controlling the tension or compression on the drill string, or it can be activated by controlling the circulation pressure. Note that the jar should be installed closer to the drill bit then is typical of other jar applications. It has been found that more than enough force of the right frequency content is available to generate detectable seismic signals at the surface.

Techniques used to measure the seismic signals near a drilling rig that generates some acoustic vibrations will now be described in greater detail. There are a several methods that could be used to record high quality seismic signals. According to some embodiments, a geophone array is buried into a shallow borehole deeper than one wavelength of the dominant frequency of the Rayleigh surface wave. The surface wave decays exponentially as depth increases. According to some other embodiments, an array of receivers is used to beamform the up going waves in the recording to reject wave propagating from the broadside of the array. According to yet other embodiments, a separate receiver array is used to perform surface noise cancellations. In many applications, buried geophone arrays together with an effective velocity filter to preserve up going waves are sufficient to provide us quality signals.

The surface geophone arrays are inexpensive and do not require special packaging for pressure and temperature.

Therefore, one can deploy as many receiver arrays to cover larger angles when measure the under ground velocity. With appropriate source and receivers configurations one can additionally obtain the shear velocity information.

Another significant benefit of many of the embodiments described herein is that there is no need to follow a predetermined schedule for taking the data. Therefore, the measurement techniques will not create unnecessary operational difficulties to the service or drilling crews. In addition, there is no need to move the surface source to follow the drill bit while drilling a deviated well. The measurement has the flexibility of being performed at any time and depth provided there is a momentary stop for drilling to allow downhole receiver to hear the surface source in a quieter environment.

According to the reciprocal theorem the signals detected at the surface due to a downhole source will be similar to those signals detected at downhole due to a surface source. Therefore, advantageously, there is no need to transfer downhole waveforms to the surface. According to some embodiments, the recorded surface signal are processed for drill bit look ahead applications.

An important benefit of using this new technology is the precise measurement of the velocity according to its depth in situ, which gives the power to the geophysicists and geologists to refine their seismic map and make more meaningful as well as timely drilling decisions in developing their reservoir.

Figure 5:
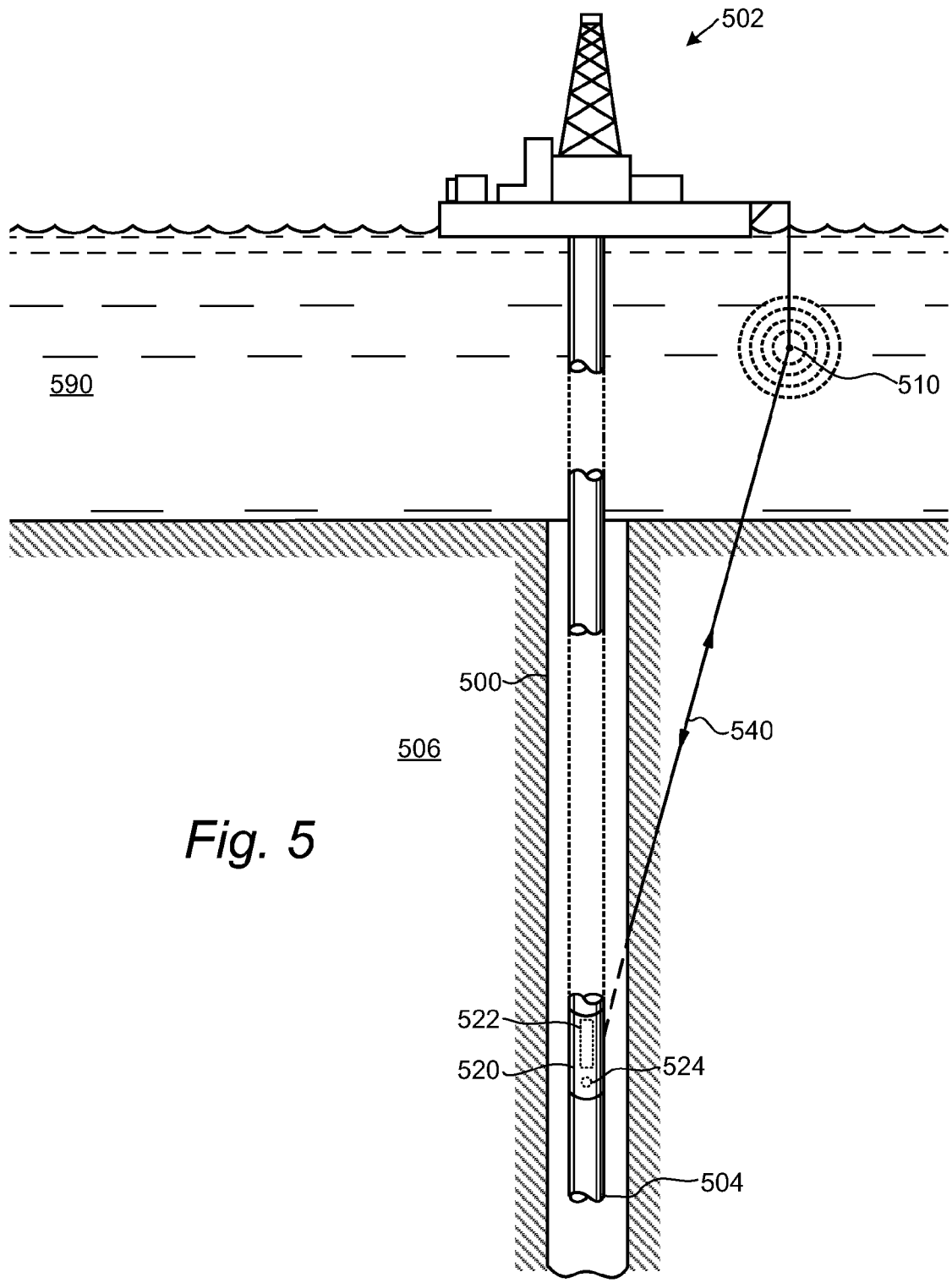
FIG. 5 shows a system for making seismic measurements in a marine environment, according to some embodiments.

FIG. 5 shows a system for making seismic measurements in a marine environment, according to some embodiments. On the surface, a seismic unit 510 includes one or more seismic receivers and a seismic source. In marine environments such as depicted in FIG. 5, unit 510 would typically include an airgun based seismic source, and one or more hyrdophones. According to some embodiments, one or more arrays of receivers are used in arrangements such as on the ocean bottom, or on streamers within the sea 590 can be used to measure the seismic signals at the surface. In cases where such moving receivers are used, GPS information is used to correctly locate the position of the receivers while the data is recorded. Extending from rig 502 is wellbore 500 within subterranean formations 506. Within wellbore 500 is drillstring 504 including a drillbit (not shown). Mounted on drillstring 504 is downhole seismic unit 520 which includes a downhole source 522 and one or more downhole receivers such as receiver 524. The rig 502 and the surface seismic unit 510 are in communication with processing station located on rig 502 or some other location. Ray trace 540 shows the direct path of a compressional wave from the surface source to downhole receiver 524, and from downhole source 522 to the surface receiver or receivers.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of making seismic measurements comprising:
transmitting seismic energy into the earth using a surface seismic source located on the surface of the earth;
receiving the seismic energy from the surface seismic source with one or more downhole receivers located in a borehole;
in response to the receiving of the seismic energy from the surface seismic source, transmitting seismic energy into the earth using a downhole seismic source located in a borehole; and
receiving the seismic energy from the downhole seismic source with one or more surface receivers located on the surface of the earth; and
measuring downhole a delay interval between the first arrival of the seismic energy from the surface seismic source and the transmitting of seismic energy using the downhole seismic source using the one or more downhole receivers.

2. A method according to claim 1 further comprising transmitting the measured delay interval to the surface.

3. A method according to claim 2 wherein the transmission of the delay interval uses mud pulse telemetry.

4. A method according to claim 2 further comprising measuring on the surface a surface interval between the transmitting of seismic energy using the surface seismic source and first arrival of the seismic energy from the downhole seismic source using the one or more surface receivers.

5. A method according to claim 4 further comprising calculating a travel time based at least in part on the measured surface interval and the measured delay interval.

6. A method according to claim 1 wherein the transmission from downhole source occurs at a predetermined time after the seismic energy from surface source is received by the one or more downhole receivers.

7. A method according to claim 1 wherein the downhole source and the one or more downhole receivers are mounted on a drillstring having a drillbit.

8. A method according to claim 7 wherein the transmission using the surface source while the drillbit is not actively drilling.

9. A method according to claim 8 wherein method is repeated during a process of extending the borehole.

10. A method according to claim 7 further comprising processing data representing the seismic energy from the downhole source as received by the one or more surface receivers thereby generating information useful in look-ahead drilling applications.

11. A method according to claim 1 wherein the downhole source is a jar tool.

12. A method according to claim 1 wherein the one or more surface receivers include an array of geophones located on land.

13. A method according to claim 1 wherein the one or more surface receivers include one or more hydrophones submerged in the sea, and the surface seismic source is an air gun submerged in the sea.

14. A system or making seismic measurements during a drilling operation comprising:

a surface seismic source adapted to transmit seismic energy into the earth from in a surface location;

one or more surface seismic receivers adapted to be positioned on the surface and to receive seismic energy travelling in the earth;

a downhole seismic source adapted to be mounted on a drillstring and to transmit seismic energy into the earth from a downhole location;

one or more downhole seismic receivers adapted to be mounted on a drillstring and to receive seismic energy travelling in the earth while deployed in a downhole location; and a downhole control system in communication with the one or more downhole receivers, programmed to cause the downhole seismic source to transmit seismic energy into the earth from a downhole location in response to receiving seismic energy from the surface seismic source by the one or more downhole seismic receivers wherein;

the downhole control system is further programmed to measure downhole a delay interval between a first arrival of the seismic energy from the surface seismic source and the transmitting of seismic energy using the dowhnhole seismic source using the one or more downhole receivers.

15. A system according to claim 14 further comprising a downhole transmitter mounted on the drillstring adapted to transmit data to the surface, wherein downhole control system is further programmed to cause the measured delay interval to be transmitted to the surface using the transmitter.

16. A system according to claim 15 further comprising:
a surface control system adapted to measure on the surface a surface interval between the transmission of seismic energy using the surface seismic source and first arrival of seismic energy from the downhole seismic source using the one or more surface receivers; and
a surface processing system programmed to calculating a travel time based at least in part on the measured surface interval and the measured delay interval.

17. A system according to claim 14 further comprising calculating a travel time based at least in part on the measured surface interval and the measured delay interval.

18. A system according to claim 14 further comprising a surface processing system programmed to generate information useful in look-ahead drilling applications based at least in part on data representing the seismic energy from the downhole source as received by the one or more surface receivers.

* * * * *